(12) United States Patent
Daly

(10) Patent No.: US 10,681,204 B2
(45) Date of Patent: *Jun. 9, 2020

(54) SEPARATING SENSITIVE DATA FROM MOBILE DEVICES FOR THEFT PREVENTION

(71) Applicant: AT&T Intellectual Property I, L.P., Atlanta, GA (US)

(72) Inventor: Brian Kevin Daly, Peachtree Corners, GA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/101,622

(22) Filed: Aug. 13, 2018

(65) Prior Publication Data

US 2018/0352075 A1 Dec. 6, 2018

Related U.S. Application Data

(63) Continuation of application No. 14/549,097, filed on Nov. 20, 2014, now Pat. No. 10,051,111.

(51) Int. Cl.
*H04W 12/06* (2009.01)
*H04L 9/00* (2006.01)
(Continued)

(52) U.S. Cl.
CPC ......... *H04M 1/72577* (2013.01); *H04M 1/67* (2013.01); *H04W 4/90* (2018.02);
(Continued)

(58) Field of Classification Search
CPC .. G06F 21/606; G06F 19/323; G06F 21/6245; G06F 21/35; H04W 76/023;
(Continued)

(56) References Cited

U.S. PATENT DOCUMENTS 7,194,438 B2   3/2007   Sovio et al.
7,937,072 B2   5/2011   Kuo et al.
(Continued)

FOREIGN PATENT DOCUMENTS

CN   202662003      1/2013
KR   101103045      1/2012
WO   WO 2012123859  9/2012

OTHER PUBLICATIONS

Smart Card Alliance, "The Mobile Payments and NFC Landscape: A U.S. Perspective," Smart Card Alliance Payments Council White Paper, Sep. 2011, Smart Card Alliance.
(Continued)

*Primary Examiner* — Khawar Iqbal
(74) *Attorney, Agent, or Firm* — Hartman & Citrin LLC (57) ABSTRACT

Concepts and technologies are disclosed herein for separating sensitive data from mobile devices for theft prevention. According to one aspect, a system includes a data security platform and a mobile device platform. The mobile device platform can detect that the data security platform is connected. The mobile device platform can determine whether the data security platform is part of an authenticated pair with the mobile device platform. In response to determining that the data security platform is part of an authenticated pair with the mobile device platform, the mobile device platform can access at least a portion of sensitive data that is stored in a memory component of the data security platform. If the data security platform is disconnected from the mobile device platform, the mobile device platform cannot function or can provide limited functionality, such as a function to communication with a 9-1-1 service.

14 Claims, 6 Drawing Sheets

(51) Int. Cl.
  *H04M 1/725* (2006.01)
  *H04W 12/08* (2009.01)
  *H04M 1/67* (2006.01)
  *H04W 4/90* (2018.01)
  *H04W 12/12* (2009.01)
  *H04W 88/02* (2009.01)

(52) U.S. Cl.
  CPC .......... *H04W 12/06* (2013.01); *H04W 12/08* (2013.01); *H04W 12/0806* (2019.01); *H04W 12/1206* (2019.01); *H04W 88/02* (2013.01)

(58) Field of Classification Search
  CPC .... H04W 12/06; H04L 63/0853; H04L 43/10; H04L 63/061; H04L 63/0823; H04M 1/7253; H04M 1/0258; G07C 9/00007
  USPC ....... 455/410, 411, 412.1, 414.1, 414.4, 421, 455/41.1
  See application file for complete search history.

(56) References Cited

U.S. PATENT DOCUMENTS

| | | | |
|---|---|---|---|
| 8,244,181 | B2 | 8/2012 | Shuo |
| 8,307,131 | B2 | 11/2012 | Prevost et al. |
| 8,356,348 | B2 | 1/2013 | Lin |
| 8,467,770 | B1 | 6/2013 | Ben Ayed |
| 8,750,797 | B2 | 6/2014 | Ketari |
| 9,461,995 | B2 | 10/2016 | Du |
| 9,532,336 | B2 | 12/2016 | Park |
| 9,613,226 | B2 | 4/2017 | Khassanov |
| 9,655,053 | B2 * | 5/2017 | Park .......... H04B 7/26 |
| 9,672,386 | B2 | 6/2017 | Takemura |
| 10,382,422 | B2 * | 8/2019 | Nix .......... H04L 9/0819 |
| 2004/0046638 | A1 | 3/2004 | Kawasaki |
| 2006/0242693 | A1 | 10/2006 | Kussmaul |
| 2008/0005426 | A1 | 1/2008 | Bacastow et al. |
| 2011/0113235 | A1 | 5/2011 | Erickson |
| 2011/0314539 | A1 | 12/2011 | Horton |
| 2012/0304312 | A1 * | 11/2012 | Dong .......... G06F 21/00 726/28 |
| 2013/0200999 | A1 * | 8/2013 | Spodak .......... G05B 1/01 340/5.65 |
| 2013/0219164 | A1 | 8/2013 | Hamid |
| 2013/0225127 | A1 | 8/2013 | Cavacuiti |
| 2013/0304866 | A1 | 11/2013 | Wu et al. |
| 2013/0311688 | A1 | 11/2013 | Kittinger |
| 2014/0075567 | A1 | 3/2014 | Raleigh |
| 2014/0137235 | A1 | 5/2014 | Horton |
| 2014/0263648 | A1 | 9/2014 | Van Bosch |
| 2015/0077224 | A1 | 3/2015 | Pal |
| 2015/0143125 | A1 * | 5/2015 | Nix .......... H04L 9/14 713/171 |
| 2015/0278498 | A1 | 10/2015 | Hong |
| 2015/0296379 | A1 * | 10/2015 | Nix .......... H04B 1/3816 713/171 |
| 2015/0379283 | A1 | 12/2015 | Spodak |
| 2016/0021691 | A1 * | 1/2016 | Lee .......... H04W 12/04 455/435.1 |
| 2016/0044445 | A1 * | 2/2016 | Hu .......... H04B 5/00 455/41.3 |
| 2016/0099923 | A1 * | 4/2016 | Golla .......... H04W 12/04 713/171 |
| 2016/0112390 | A1 * | 4/2016 | Thorgrimsson .......... H04L 63/08 726/7 |
| 2017/0115828 | A1 | 4/2017 | Langlois |
| 2017/0373845 | A1 * | 12/2017 | Nix .......... H04J 11/00 |
| 2018/0213393 | A1 * | 7/2018 | Park .......... H04W 8/205 |
| 2019/0223132 | A1 * | 7/2019 | Miao .......... H04W 36/08 |
| 2019/0349353 | A1 * | 11/2019 | Hoyer .......... H04W 12/10 |

OTHER PUBLICATIONS

U.S. Office Action dated Feb. 23, 2016 in U.S. Appl. No. 14/549,097.
U.S. Office Action dated Jun. 20, 2016 in U.S. Appl. No. 14/549,097.
U.S. Office Action dated Nov. 2, 2016 in U.S. Appl. No. 14/549,097.
U.S. Office Action dated Mar. 13, 2017 in U.S. Appl. No. 14/549,097.
U.S. Office Action dated Jul. 12, 2017 in U.S. Appl. No. 14/549,097.
U.S. Office Action dated Nov. 2, 2017 in U.S. Appl. No. 14/549,097.
U.S. Notice of Allowance dated Apr. 3, 2018 in U.S. Appl. No. 14/549,097.

* cited by examiner

SEPARATING SENSITIVE DATA FROM MOBILE DEVICES FOR THEFT PREVENTION

CROSS-REFERENCE TO RELATED APPLICATIONS

This application is a continuation of U.S. patent application Ser. No. 14/549,097, entitled "Separating Sensitive Data From Mobile Devices For Theft Prevention," filed Nov. 20, 2014, now U.S. Pat. No. 10,051,111, which is incorporated herein by reference in its entirety.

BACKGROUND

The Federal Communications Commission ("FCC") has taken interest in mobile device theft prevention. Recently, the FCC created the Mobile Device Theft Prevention working group under the Technological Advisory Council ("TAC"). The purpose of the Mobile Device Theft Prevention working group is chartered to identify innovative ways to deter theft of mobile devices. The reason for the prevention of mobile devices theft is twofold: first, the goal is to take away value of the hardware on the device from the black market; and second, the goal is to protect sensitive data on the device, such as phone books, user identifying data, and monetary data such as financial data.

SUMMARY

Concepts and technologies are disclosed herein for separating sensitive data from mobile devices for theft prevention. According to one aspect of the concepts and technologies disclosed herein, a mobile device platform can include an interface to a data security platform. The data security platform can store sensitive data. The mobile device platform can detect that the data security platform is connected via the interface. The mobile device platform can determine whether the data security platform is part of an authenticated pair with the mobile device platform. The mobile device platform can access at least a portion of the sensitive data in response to determining that the data security platform is part of an authenticated pair with the mobile device platform. The mobile device platform can perform operations with the sensitive data as long as the data security platform is still connected via the interface. When the data security platform is no longer connected via the interface, the mobile device platform can perform a denial action to deny further access to the sensitive data stored in the data security platform.

According to another aspect of the concepts and technologies disclosed herein, a data security platform can include a memory that stores sensitive data. The data security platform also can include an interface that, when connected to a mobile device platform, can determine whether the mobile device platform is part of an authenticated pair with the data security platform. The data security platform can permit the mobile device platform to access at least a portion of the sensitive data in response to determining that the mobile device platform is part of the authenticated pair with the data security platform.

According to another aspect of the concepts and technologies disclosed herein, a system can include a data security platform and a mobile device platform. The data security platform can include a data security platform-side data security interface and a data security platform memory component that stores sensitive data. The mobile device platform can include a mobile device platform-side data security interface, a processor, and a memory that stores computer-readable instructions that, when executed by the processor, causes the processor to perform operations. The mobile device platform can perform an operation to detect that the data security platform-side data security interface is connected via the mobile device platform-side data security interface. The mobile device platform can perform an operation to determine whether the data security platform is part of an authenticated pair with the mobile device platform. The mobile device platform can access at least a portion of the sensitive data from the data security platform memory component in response to determining that the data security platform is part of an authenticated pair with the mobile device platform.

In some embodiments, the mobile device platform cannot function without a connection to the data security platform. In some other embodiments, the mobile device platform has limited functionality without a connection to the data security platform. The limited functionality can include a function to communicate with a 9-1-1 service.

The sensitive data can include any data that can be used to identify, at least in part, one or more users of the mobile device platform. In some embodiments, the sensitive data includes data associated with one or more subscription services to which one or more users (subscribers) of the mobile device platform are subscribed. The subscription services can include, but are not limited to, voice services, data services, voice over internet protocol ("VoIP") services, messaging services, entertainment services (e.g., TV, movies, video games, and/or music), combinations thereof, and the like. The data associated with the subscription service(s) can include service type(s), account number(s), security information (e.g., username, password, and/or other authentication credentials), other subscription-specific data, combinations thereof, and the like. In some embodiments, the sensitive data can include user data such as, but not limited to, name, age, gender, marital status, number of children, telephone number(s), physical address(es), email address(es), web site(s), employer(s), international mobile subscriber identity ("IMSI"), combinations thereof, and the like. In some embodiments, the sensitive data can include financial data associated with one or more financial accounts of a user of the mobile device platform. Some examples of financial accounts include checking accounts, savings accounts, certificate of deposit ("CD") accounts, money market accounts, retirements, credit card accounts, credit line accounts, mortgage accounts, loan accounts, and the like.

In some embodiments, the interface can include a wired interface. In these embodiments, the data security platform can be embodied in a fob form factor that can be inserted into the mobile device platform-side data security interface. In some other embodiments, the interface can include a wireless interface. A hybrid wired/wireless interface is also contemplated.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The Federal Communications Commission ("FCC") has taken interest in mobile device theft prevention. Recently, the FCC created the Mobile Device Theft Prevention working group under the Technological Advisory Council ("TAC"). The purpose of the Mobile Device Theft Prevention working group is chartered to identify innovative ways to deter theft of mobile devices. The reason for the prevention of mobile device theft is twofold: first, the goal is to take away value of the hardware on the device from the black market; and second, the goal is to protect sensitive data on the device, such as phone books, user identifying data, and monetary data such as financial data.

Solutions exist today that allow for remote deletion (also called "wiping") of sensitive data from a user's mobile device if the user's mobile device is lost or stolen. A person, such as a thief, that is in possession of the user's mobile device can block the remote deletion function, thereby circumventing the user's only recourse in maintaining privacy of his or her data.

The concepts and technologies disclosed herein separate sensitive data from mobile device hardware. In doing so the concepts and technologies disclosed herein can protect sensitive data from unauthorized access, can provide a backup mechanism for sensitive user data, can provide restoration functionality for sensitive user data, and can deter theft of mobile devices.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer system configurations, including hand-held devices, mobile devices, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, example aspects of separating sensitive data from mobile devices for theft prevention will be presented.

Figure 1:
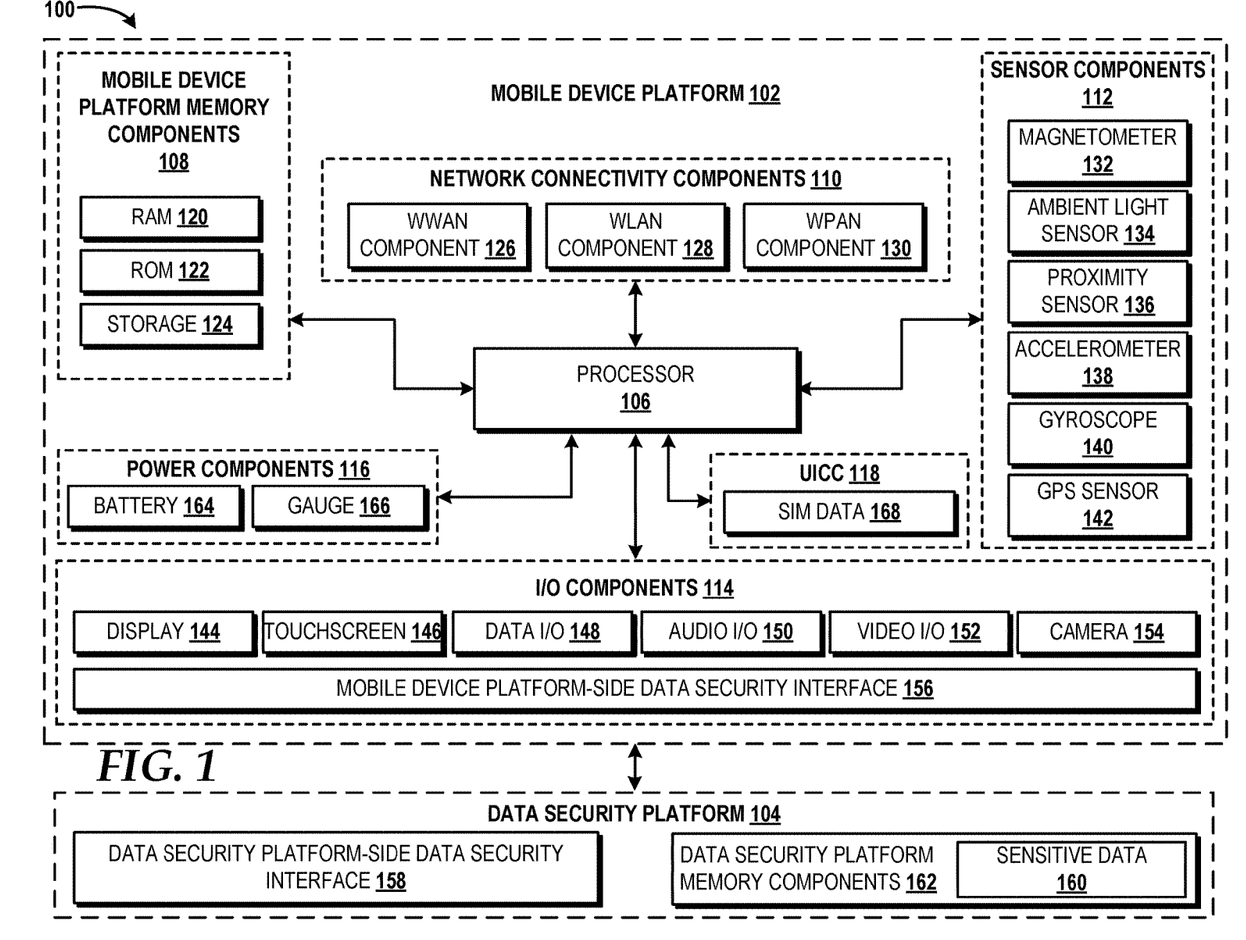
FIG. 1 is a block diagram illustrating aspects of an illustrative operating environment for various concepts disclosed herein.

Referring now to FIG. 1, aspects of an operating environment 100 in which various embodiments presented herein may be implemented will be described, according to an illustrative embodiment. The illustrated operating environment 100 includes a mobile device platform 102 and a data security platform 104. In some embodiments, the mobile device platform 102 utilizes a variation of the component architecture of the mobile device platform 102 shown in FIG. 1. In some embodiments, the data security platform 104 utilizes a variation of the component architecture of the data security platform 104. As such, the illustrated embodiment should not be construed as being limiting in any way.

In some embodiments, the data security platform 104 is a fob form factor similar to a thumb drive or the like. In these embodiments, the data security platform 104 can be physically connected to the mobile device platform 102 via a universal serial bus ("USB") or the like, and can function as a removable memory device upon which data can be stored. As such, the data security platform 104 can become a memory/storage component for the overall architecture of the mobile device platform 102. In some other embodiments, the data security platform 104 can be wirelessly connected to the mobile device platform 102 via BLUETOOTH, BLUETOOTH Low Energy ("LE"), WI-FI, ZIGBEE, near-field communications ("NFC"), or the like. In these embodiments, the data security platform 104 can be worn by a user, placed in the user's pocket or purse, or can be attached to a keychain or the like.

In some embodiments, the mobile device platform 102 cannot function without a connection to the data security platform 104. In some other embodiments, the mobile device platform 102 has limited functionality without a connection to the data security platform 104. By way of example, and not limitation, the mobile device platform 102 may allow 9-1-1 calls per FCC rules with or without a connection to the data security platform 104.

In some embodiments, the mobile device platform 102 and the data security platform 104 form an authenticated pair. In these embodiments, one or more authentication protocols are used to permit the mobile device platform 102 and the data security platform 104 to be used together, and to deny any other data security platform to be utilized with the mobile device platform 102, and vice versa. Moreover, in some embodiments, the authentication protocol(s) can request authentication credentials, such as username, password, biometrics, and/or the like to authenticate a connection between the mobile device platform 102 and the data security platform 104. In some embodiments, the data security platform 104 can communicate with a remote backup service via the mobile device platform 102 and/or a computing system to backup sensitive data stored on the data security platform 104.

The mobile device platform 102 illustrated in FIG. 1 includes a processor 106, mobile device platform memory components 108, network connectivity components 110, sensor components 112, input/output ("I/O") components 114, power components 116, and a universal integrated circuit card ("UICC") 118, each of which will be described below in detail. Although no connections are shown between the individual components of the mobile device platform 102, the components can interact to carry out mobile device platform functions. Also, although no connections are shown between the individual components of the data security platform 104, the components can interact to carry out data security platform functions. In some embodiments, these components are arranged so as to communicate via one or more busses (not shown).

The processor 106 includes a central processing unit ("CPU") configured to process data, execute computer-executable instructions of one or more application programs, and communicate with other components of the mobile device platform 102 in order to perform various functionality described herein. The processor 106 may be utilized to execute aspects of the software components presented herein.

In some embodiments, the processor 106 is or is included in a system-on-chip ("SoC") along with one or more of the other components described below. For example, the SoC may include the processor 106, a GPU, one or more of the network connectivity components 110, and one or more of the sensor components 112. In some embodiments, the processor 106 is fabricated, at least in part, utilizing a package-on-package ("PoP") integrated circuit packaging technique. The processor 106 may be a single core or multi-core processor.

The processor 106 may be created in accordance with an ARM architecture, available for license from ARM HOLDINGS of Cambridge, United Kingdom. Alternatively, the processor 106 may be created in accordance with an x86 architecture, such as is available from INTEL CORPORATION of Mountain View, Calif. and others. In some embodiments, the processor 106 is a SNAPDRAGON SoC, available from QUALCOMM of San Diego, Calif.; a TEGRA SoC, available from NVIDIA of Santa Clara, Calif.; a HUMMINGBIRD SoC, available from SAMSUNG of Seoul, South Korea; an Open Multimedia Application Platform ("OMAP") SoC, available from TEXAS INSTRUMENTS of Dallas, Tex.; a customized version of any of the above SoCs; or a proprietary SoC.

The illustrated mobile device platform memory components 108 include a random access memory ("RAM") 120, a read-only memory ("ROM") 122, and a storage memory 124. In some embodiments, the RAM 120 or a portion thereof, the ROM 122 or a portion thereof, and/or some combination the RAM 120 and the ROM 122 is integrated with the processor 106. In some embodiments, the ROM 122 is configured to store a firmware, an operating system or a portion thereof (e.g., operating system kernel), and/or a bootloader to load an operating system kernel from the storage 124.

The storage 124 can include a solid-state memory, a hard disk, or a combination of solid-state memory and a hard disk. The storage 124 may be soldered or otherwise connected to a logic board upon which the processor 106 and other components described herein also may be connected. As such, the storage 124 can be integrated in the mobile device platform 102. Alternatively, the storage 124 can be removable and provided in lieu of integrated storage or as additional optional storage. It is contemplated that removable storage and integrated storage can be logically combined such that the total available storage is made available as a total combined storage capacity.

As removable storage, the storage 124 can be inserted into a removable storage memory slot (not shown) or other mechanism by which the storage 124 is inserted and secured to facilitate a connection over which the storage 124 can communicate with other components of the mobile device platform 102, such as the processor 106. The storage 124, in this embodiment, may be embodied in various memory card formats including, but not limited to, PC card, CompactFlash card, memory stick, secure digital ("SD"), miniSD, microSD, a proprietary format, or the like.

It should be understood that one or more of the mobile device platform memory components 108 can store one or more operating systems, such as, but not limited to, SYMBIAN OS from SYMBIAN LIMITED; WINDOWS mobile OS from Microsoft Corporation of Redmond, Wash.; WINDOWS phone OS from Microsoft Corporation; WINDOWS from Microsoft Corporation; PALM WEBOS from Hewlett-Packard Company of Palo Alto, Calif.; BLACKBERRY OS from Research In Motion Limited of Waterloo, Ontario, Canada; IOS from Apple Inc. of Cupertino, Calif.; and ANDROID OS from Google Inc. of Mountain View, Calif. Other operating systems are contemplated.

It should be understood that one or more of the mobile device platform memory components 108 can store one or more applications, such as, but not limited to, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like.

The illustrated network connectivity components 110 include a wireless wide area network ("WWAN") component 126, a wireless local area network ("WLAN") component 128, and a wireless personal area network ("WPAN") component 130. The network connectivity components 110 facilitate communications to and from one or more networks, which may be WWANs, WLANs, WPANs, or some combination thereof. The network connectivity components 110 may facilitate simultaneous communication with multiple networks. For example, the network connectivity components 110 may facilitate simultaneous communications with a WWAN and a WLAN.

In some embodiments, the WWAN component 126 can provide dual-mode or multi-mode connectivity to a WWAN and/or one or more other networks. For example, the WWAN component 126 can provide connectivity to a wireless network that provides service via Global System for Mobile communications ("GSM") and/or Universal Mobile Telecommunications System ("UMTS") technologies, or via some other combination of technologies. Alternatively, multiple WWAN components 126 can be utilized to perform such functionality, and/or provide additional functionality to support other non-compatible technologies (i.e., incapable of being supported by a single WWAN component). The WWAN component 126 may facilitate similar connectivity to multiple networks (e.g., a UMTS network and a Long-Term Evolution ("LTE") network).

The illustrated sensor components 112 include a magnetometer 132, an ambient light sensor 134, a proximity sensor 136, an accelerometer 138, a gyroscope 140, and a Global Positioning System sensor ("GPS sensor") 142. It is contemplated that other sensors, such as, but not limited to, temperature sensors or shock detection sensors, also may be incorporated in the sensor components 112 of the mobile device platform 102.

The magnetometer 132 can measure the strength and direction of a magnetic field. In some embodiments the magnetometer 132 provides measurements to a compass application program stored within one of the mobile device platform memory components 108 in order to provide a user with accurate directions in a frame of reference including the cardinal directions, north, south, east, and west. Similar measurements may be provided to a navigation application program that includes a compass component. Other uses of measurements obtained by the magnetometer 132 are contemplated.

The ambient light sensor 134 is configured to measure ambient light. In some embodiments, the ambient light sensor 134 provides measurements to an application program stored within one of the mobile device platform memory components 108 in order to automatically adjust the brightness of a display (described below) to compensate for low-light and high-light environments. Other uses of measurements obtained by the ambient light sensor 134 are contemplated.

The proximity sensor 136 is configured to detect the presence of an object or thing in proximity to the mobile device platform 102 without direct contact. In some embodiments, the proximity sensor 136 detects the presence of a user's body (e.g., the user's face) and provides this information to an application program stored within one of the mobile device platform memory components 108 that utilizes the proximity information to enable or disable some functionality of the mobile device platform 102. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 136 are contemplated.

The accelerometer 138 is configured to measure proper acceleration. In some embodiments, output from the accelerometer 138 is used by an application program as an input mechanism to control some functionality of the application program. For example, the application program may be a video game in which a character, a portion thereof, or an object is moved or otherwise manipulated in response to input received via the accelerometer 138. In some embodiments, output from the accelerometer 138 is provided to an application program for use in switching between landscape and portrait modes, calculating coordinate acceleration, or detecting a fall. Other uses of the accelerometer 138 are contemplated.

The gyroscope 140 is configured to measure and maintain orientation. In some embodiments, output from the gyroscope 140 is used by an application program as an input mechanism to control some functionality of the application program. For example, the gyroscope 140 can be used for accurate recognition of movement within a 3D environment of a video game application or some other application. In some embodiments, an application program utilizes output from the gyroscope 140 and the accelerometer 138 to enhance control of some functionality of the application program. Other uses of the gyroscope 140 are contemplated.

The GPS sensor 142 is configured to receive signals from GPS satellites for use in calculating a location. The location calculated by the GPS sensor 142 may be used by any application program that requires or benefits from location information. For example, the location calculated by the GPS sensor 142 may be used with a navigation application program to provide directions from the location to a destination or directions from the destination to the location. Moreover, the GPS sensor 142 may be used to provide location information to an external location-based service, such as E911 service. The GPS sensor 142 may obtain location information generated via WI-FI, WIMAX, and/or cellular triangulation techniques utilizing one or more of the network connectivity components 110 to aid the GPS sensor 142 in obtaining a location fix. The GPS sensor 142 may also be used in Assisted GPS ("A-GPS") systems.

The illustrated I/O components 114 include a display 144, a touchscreen 146, a data I/O interface component ("data I/O") 148, an audio I/O interface component ("audio I/O") 150, a video I/O interface component ("video I/O") 152, a camera 154, and a mobile device platform-side data security interface 156. In some embodiments, the display 144 and the touchscreen 146 are combined. In some embodiments, two or more of the data I/O component 148, the audio I/O component 150, and the video I/O component 152 are combined. The illustrated I/O components 114 may include discrete processors configured to support the various interfaces described below, or may include processing functionality built-in to the processor 106.

The display 144 is an output device configured to present information in a visual form. In particular, the display 144 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some embodiments, the display 144 is a liquid crystal display ("LCD") utilizing any active or passive matrix technology and any backlighting technology (if used). In some embodiments, the display 144 is an organic light emitting diode ("OLED") display. Other display types are contemplated.

The touchscreen 146 is an input device configured to detect the presence and location of a touch. The touchscreen 146 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some embodiments, the touchscreen 146 is incorporated on top of the display 144 as a transparent layer to enable a user to use one or more touches to interact with objects or other information presented on the display 144. In other embodiments, the touchscreen 146 is a touch pad incorporated on a surface of the mobile device platform 102 that does not include the display 144. For example, the mobile device platform 102 may have a touchscreen incorporated on top of the display 144 and a touch pad on a surface opposite the display 144.

In some embodiments, the touchscreen 146 is a single-touch touchscreen. In other embodiments, the touchscreen 146 is a multi-touch touchscreen. In some embodiments, the touchscreen 146 is configured to detect discrete touches, single touch gestures, and/or multi-touch gestures. Gestures may be implemented in software for use with the touchscreen 146. As such, a developer may create gestures that are specific to a particular application program.

The data I/O interface component 148 is configured to facilitate input of data (e.g., via a keyboard, keypad, or other input device) to the mobile device platform 102 and output of data from the mobile device platform 102. In some embodiments, the data I/O interface component 148 includes a connector configured to provide wired connectivity between the mobile device platform 102 and a computer system, for example, for synchronization operation purposes. The connector may be a proprietary connector or a standardized connector such as USB, micro-USB, mini-USB, or the like. In some embodiments, the connector is a dock connector for docking the mobile device platform 102 with another device such as a docking station, audio device (e.g., a digital music player), or video device.

The audio I/O interface component 150 is configured to provide audio input and/or output capabilities to the mobile device platform 102. In some embodiments, the audio I/O interface component 150 includes a microphone configured to collect audio signals. In some embodiments, the audio I/O interface component 150 includes a headphone jack configured to provide connectivity for headphones or other external speakers. In some embodiments, the audio I/O interface component 150 includes a speaker for the output of audio signals. In some embodiments, the audio I/O interface component 150 includes an optical audio cable out.

The video I/O interface component 152 is configured to provide video input and/or output capabilities to the mobile device platform 102. In some embodiments, the video I/O interface component 152 includes a video connector configured to receive video as input from another device (e.g., a video media player such as a DVD or BLURAY player) or send video as output to another device (e.g., a monitor, a television, or some other external display). In some embodiments, the video I/O interface component 152 includes a High-Definition Multimedia Interface ("HDMI"), mini-HDMI, micro-HDMI, DisplayPort, or proprietary connector to input/output video content. In some embodiments, the video I/O interface component 152 or portions thereof is combined with the audio I/O interface component 150 or portions thereof.

The camera 154 can be configured to capture still images and/or video. The camera 154 may utilize a charge coupled device ("CCD") or a complementary metal oxide semiconductor ("CMOS") image sensor to capture images. In some embodiments, the camera 154 includes a flash to aid in taking pictures in low-light environments. Settings for the camera 154 may be implemented as hardware or software buttons.

The mobile device platform-side data security interface 156 provides an interface through which the mobile device platform 102 can coordinate with the data security platform 104, and more particularly, with a data security platform-side data security interface 158 of the data security platform 104, to establish a secure connection. The mobile device platform-side data security interface 156 can exchange sensitive data 160 with the data security platform 104 via the secure connection.

The sensitive data 160 can include any data that can be used to identify, at least in part, one or more users of the mobile device platform 102. In some embodiments, the sensitive data 160 includes data associated with one or more subscription services to which one or more users (subscribers) of the mobile device platform 102 are subscribed. The subscription services can include, but are not limited to, voice services, data services, voice over internet protocol ("VoIP") services, messaging services, entertainment services (e.g., TV, movies, video games, and/or music), combinations thereof, and the like. The data associated with the subscription service(s) can include service type(s), account number(s), security information (e.g., username, password, and/or other authentication credentials), other subscription-specific data, combinations thereof, and the like. In some embodiments, the sensitive data 160 includes user data such as, but not limited to, name, age, gender, marital status, number of children, telephone number(s), physical address (es), email address(es), website(s), employer(s), international mobile subscriber identity ("IMSI"), combinations thereof, and the like. In some embodiments, the sensitive data 160 includes financial data associated with one or more financial accounts of a user of the mobile device platform 102. Some examples of financial accounts include checking accounts, savings accounts, certificate of deposit ("CD") accounts, money market accounts, retirements, credit card accounts, credit line accounts, mortgage accounts, loan accounts, and the like.

The sensitive data 160 can be stored by the data security platform 104 on one or more data security platform memory components 162. The data security platform memory component(s) 162 can include storage memory. The storage memory can include a solid-state memory, a hard disk, or a combination of solid-state memory and a hard disk. The storage memory may be embodied in various memory card formats including, but not limited to, PC card, CompactFlash card, memory stick, SD, miniSD, microSD, a proprietary format, or the like. In some embodiments, the data security platform memory components 162 are powered by the power components 116 of the mobile device platform 102.

The mobile device platform-side data security interface 156 and the data security platform-side data security interface 158 each can be or can include a wireless interface and/or a wired interface utilizing any data communications technology, some examples of which include, but are not limited to, BLUETOOTH, BLUETOOTH LE, infrared, infrared data association ("IRDA"), NFC, other RF technologies, USB, IEEE 1394 ("FIREWIRE"), serial data communication technologies, parallel data communication technologies, Ethernet ("RJ45"), RJ11, proprietary data communication technologies, combinations thereof, and the like.

The mobile device platform-side data security interface 156 and the data security platform-side data security interface 158 can utilize one or more proprietary or non-proprietary authentication protocols depending upon the technology utilized to ensure protection of the sensitive data 160 during transmission to/from the mobile device platform 102 and/or transmission to/from the data security platform 104. In some embodiments, the authentication protocol(s) utilized to ensure protection of the sensitive data 160 during transmission can utilize authentication information. As used herein, "authentication information" broadly encompasses any information that can be utilized to authenticate the mobile device platform 102 to the data security platform 104, or vice versa. For example, authentication information can be or can include one or more keys, tokens, passwords, passcodes, biometric identifiers, SECUREID, personal identification numbers, hardware identifiers, combinations thereof, and the like. Those skilled in the art will appreciate the wide range of authentication protocols available to establish secure connections among devices, and so additional details in this regard are not provided herein.

In some embodiments, the mobile device platform 102 cannot function without a connection to the data security platform 104. In some other embodiments, the mobile device platform 102 has limited functionality without a connection to the data security platform 104. By way of example, and not limitation, the mobile device platform 102 may allow 9-1-1 calls per FCC rules with or without a connection to the data security platform 104.

In some embodiments, the mobile device platform 102 and the data security platform 104 form an authenticated pair. In these embodiments, one or more authentication protocols are used to permit the mobile device platform 102 and the data security platform 104 to be used together, and to deny any other data security platform to be utilized with the mobile device platform 102, and vice versa. Moreover, in some embodiments, the authentication protocol(s) can request authentication credentials, such as username, password, biometrics, and/or the like to authenticate a connection between the mobile device platform 102 and the data security platform 104. In some embodiments, the data security platform memory components 162 function as at least a portion of the mobile device platform memory components 108 when the mobile device platform 102 and the data security platform 104 are connected.

Although not illustrated, one or more hardware buttons may also be included in the mobile device platform 102 and/or the data security platform 104. Hardware buttons may be used for controlling one or more operational aspects of the mobile device platform 102 and/or the data security platform 104. The hardware buttons may be dedicated buttons or multi-use buttons. The hardware buttons may be mechanical or sensor-based.

Turning back to the mobile device platform 102, the illustrated power components 116 include one or more batteries 164, which can be connected to a battery gauge 166. The power components 116 may also include a power connector, which may be combined with one or more of the aforementioned I/O components 114. The power components 116 may interface with an external power system or charging equipment via a power I/O component (not shown). In some embodiments, the data security platform 104 draws power from the power components 116 of the mobile device platform 102. In other embodiments, the data security platform 104 is self-powered with power components similar to the power components 116.

The batteries 164 may be rechargeable or disposable. Rechargeable battery types include, but are not limited to, lithium polymer, lithium ion, nickel cadmium, and nickel metal hydride. Each of the batteries 164 may be made of one or more cells. The battery gauge 166 can be configured to measure battery parameters such as current, voltage, and temperature. In some embodiments, the battery gauge 166 is configured to measure the effect of a battery's discharge rate, temperature, age and other factors to predict remaining life within a certain percentage of error. In some embodiments, the battery gauge 166 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The illustrated UICC 118 includes subscriber identity module ("SIM") data 168. The UICC 118 can be inserted into a designated slot (not shown) in the mobile device platform 102. The UICC 118 alternatively can be integrated into the mobile device platform 102. The SIM data 168 can include information that allows the mobile device platform 102 to authenticate and to identify the mobile device platform 102 (and associated user) to one or more networks. The SIM data 168 can include a unique serial number called an integrated circuit card identification ("ICCID") to identify the UICC 118, a unique number to identify a subscriber called an international mobile subscriber identity ("IMSI"), an authentication key ("Ki") to authenticate the UICC 118 to one or more networks, the current location area identity ("LAI") that identifies a location area in which the mobile device platform 102 is currently located, an operator-specific emergency number, and other information. In some embodiments, the data security platform 104 includes, as part of the sensitive data 160, at least a portion of the SIM data 168, which can be provided to the UICC 118 via the connection established between the mobile device platform 102 and the data security platform 104.

Figure 2A:
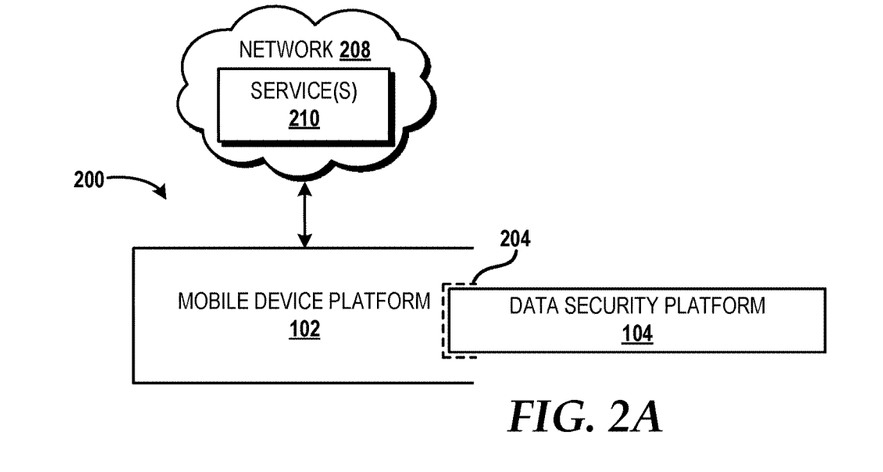
FIGS. 2A-2B are block diagrams illustrating aspects of illustrative connectivity configurations between a mobile device platform and a data security platform, according to illustrative embodiments.
Figure 2B:
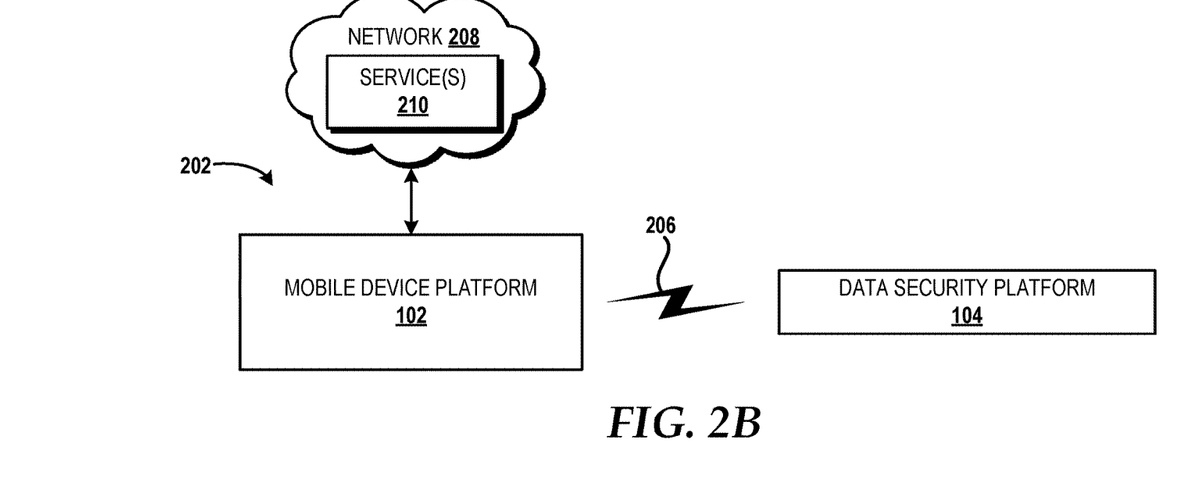

Turning now to FIGS. 2A-2B, illustrative connectivity configurations 200-202 between the mobile device platform 102 and the data security platform 104 will be described, according to illustrative embodiments. In a first connectivity configuration 200, the mobile device platform 102 is in wired communication with the data security platform 104 via a wired connection 204 established between the mobile device platform-side data security interface 156 and the data security platform-side data security interface 158 (both shown in FIG. 1). According to embodiments, the wired connection 204 can be established via USB, IEEE 1394 ("FIREWIRE"), a serial data communication technology, a parallel data communications technology, Ethernet ("RJ45"), RJ11, a proprietary data communication technology, a combination thereof, or the like. In the first connectivity configuration 200, the data security platform-side data security interface 158 of the data security platform 104 may be inserted, at least partially, into the mobile device platform-side data security interface 156, or the data security platform-side data security interface 158 may be connected externally to the mobile device platform-side data security interface 156 of the mobile device platform 102.

Turning to a second connectivity configuration 202 of the mobile device platform 102, the mobile device platform 102 is in wireless communication with the data security platform 104 via a wireless connection 206 established between the mobile device platform-side data security interface 156 and the data security platform-side data security interface 158 (both shown in FIG. 1). According to embodiments, the wireless connection 206 can be established via BLUETOOTH, BLE, infrared, IRDA, NFC, and/or other RF technologies.

In the illustrated embodiments, the mobile device platform 102 is in communication with a network 208 to access one or more services 210. The mobile device platform 102 can communicate with the network 208 via the network connectivity components 110. The network 208, in some embodiments, can be or can include one or more wireless PANs, one or more wireless LANs, one or more wireless WANS, one or more wireless MANs, one or more wireless CANs, and/or one or more packet data networks, such as the internet or a portion thereof. The network 208 may use any wireless communications technology or combination of wireless communications technologies, some examples of which include, but are not limited to, BLUETOOTH, ZIGBEE, WI-FI, WI-FI peer-to-peer, GSM, CDMA ONE, CDMA2000, UMTS, LTE, WiMAX, other IEEE 802.XX technologies, and the like.

The network 208 embodied, at least in part, as a WWAN may operate using various channel access methods (which may or may not be used by the aforementioned technologies), including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Single-Carrier FDMA ("SC-FDMA"), Space Division Multiple Access ("SDMA"), and the like. Data may be exchanged via the communications network using cellular data technologies such as, but not limited to, General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access technologies.

The services 210 can be or can include any services that are accessible via a network connection. For example, the services 210 can be or can include a voice call service, a voice over internet protocol ("VoIP") service, a voice over LTE ("VoLTE") service, a video call service, a media streaming service (e.g., a music or video service), a media download service, a web service, a local service (e.g., a local storage service), a data storage service, a television service, any combination thereof, and the like. Access to the services 210 may require authentication, which may be provided, at least in part, by at least a portion of the sensitive data 160.

Figure 3:
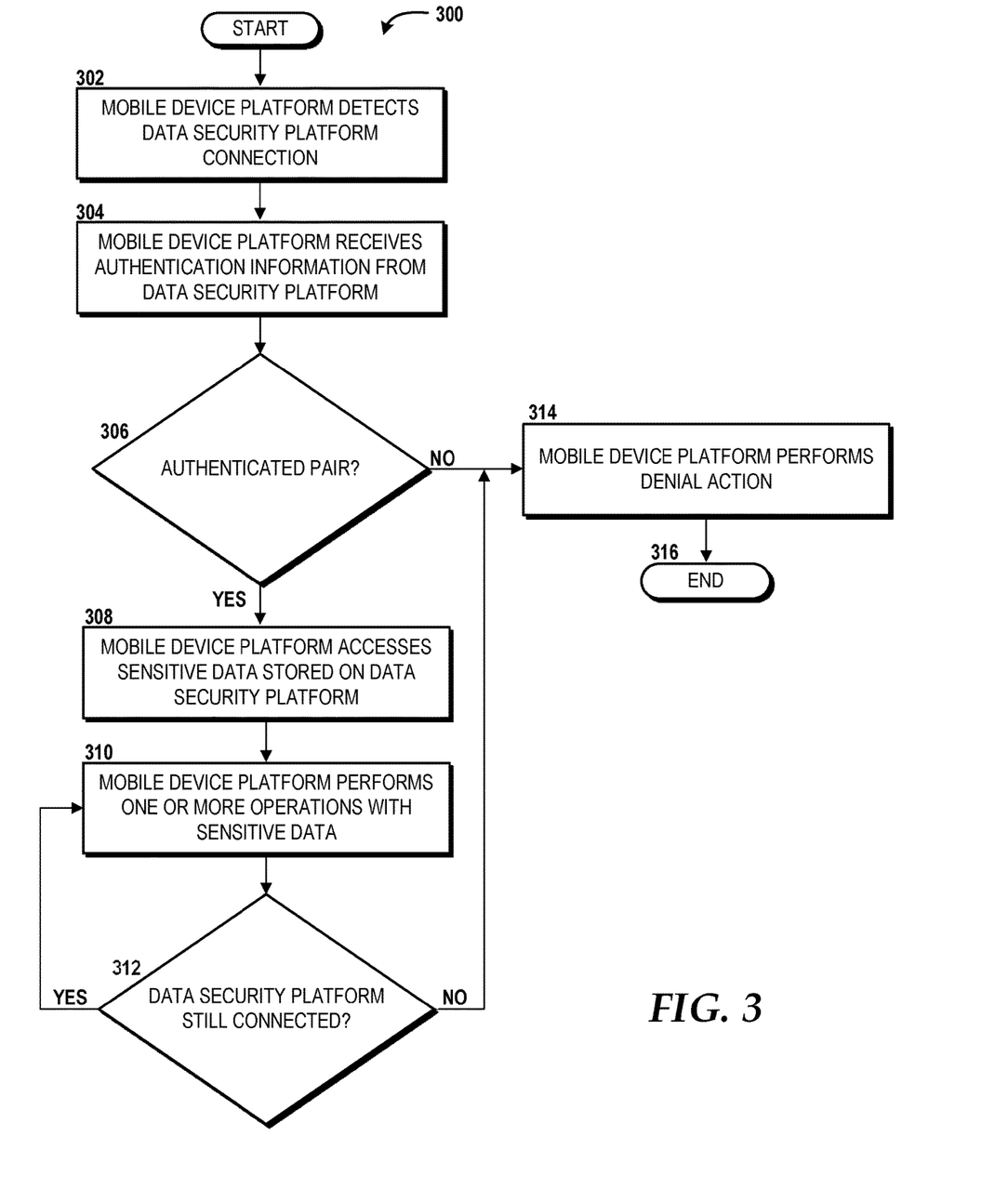
FIG. 3 is a flow diagram illustrating aspects of a method for providing authenticated access to sensitive data from the perspective of a mobile device platform, according to an illustrative embodiment.

Turning now to FIG. 3, aspects of a method 300 for providing authenticated access to the sensitive data 160 from the perspective of the mobile device platform 102 will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in their respective entireties. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including the mobile device platform 102, the data security platform 104, single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof refers to causing a processor of a computing system or device, such as the mobile device platform 102 and/or the data security platform 104 to perform one or more operations and/or causing the processor to direct other components of the computing system or device to perform one or more of the operations.

For purposes of illustrating and describing some of the concepts of the present disclosure, the methods disclosed herein are described as being performed, at least in part, by the mobile device platform 102, the data security platform 104, or a combination of the mobile device platform and the data security platform 104, via execution of one or more software modules and/or software applications. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 300 will be described with reference to FIG. 3 and further reference to FIGS. 1 and 2. The method 300 begins at operation 302, where the mobile device platform 102 detects a connection, such as the wired connection 204 or the wireless connection 206 (shown in FIGS. 2A and 2B, respectively), to the data security platform 104. From operation 302, the method 300 proceeds to operation 304, where the mobile device platform 102 receives authentication information from the data security platform 104. From operation 304, the method 300 proceeds to operation 306, where the mobile device platform 102 determines whether the data security platform 104 and the mobile device platform 102 form an authenticated pair based, at least in part, upon the authentication information received at operation 304.

If, at operation 306, the mobile device platform 102 determines that the data security platform 104 and the mobile device platform 102 form an authenticated pair, then the method 300 proceeds to operation 308, where the mobile device platform 102 accesses at least a portion of the sensitive data 160 stored on the data security platform 104. From operation 308, the method 300 proceeds to operation 310, where the mobile device platform 102 performs one or more operations with the sensitive data 160.

From operation 310, the method 300 proceeds to operation 312, where the mobile device platform 102 determines whether the data security platform 104 is still connected. If, at operation 312, the mobile device platform 102 determines that the data security platform 103 is still connected, then the method 300 reverts back to operation 310, where the mobile device platform 102 can continue to perform one or more operations with the sensitive data 160. The operations can include any operations the mobile device platform 102 is capable of performing.

If, however, at operation 312, the mobile device platform 102 determines that the data security platform 104 is no longer connected, then the method 300 proceeds to operation 314. At operation 314, the mobile device platform 102 performs a denial action to prevent the mobile device platform 102 from accessing the sensitive data 160 stored on the data security platform 104. From operation 314, the method 300 proceeds to operation 316. The method 300 ends at operation 316.

Returning to operation 306, if the mobile device platform 102 determines that the data security platform 104 is not authenticated to access the mobile device platform 102, then the method 300 proceeds to operation 314. At operation 314, the mobile device platform 102 performs a denial action to prevent the mobile device platform 102 from accessing the sensitive data 160 stored on the data security platform 104. From operation 314, the method 300 proceeds to operation 316. The method 300 ends at operation 316.

Figure 4:
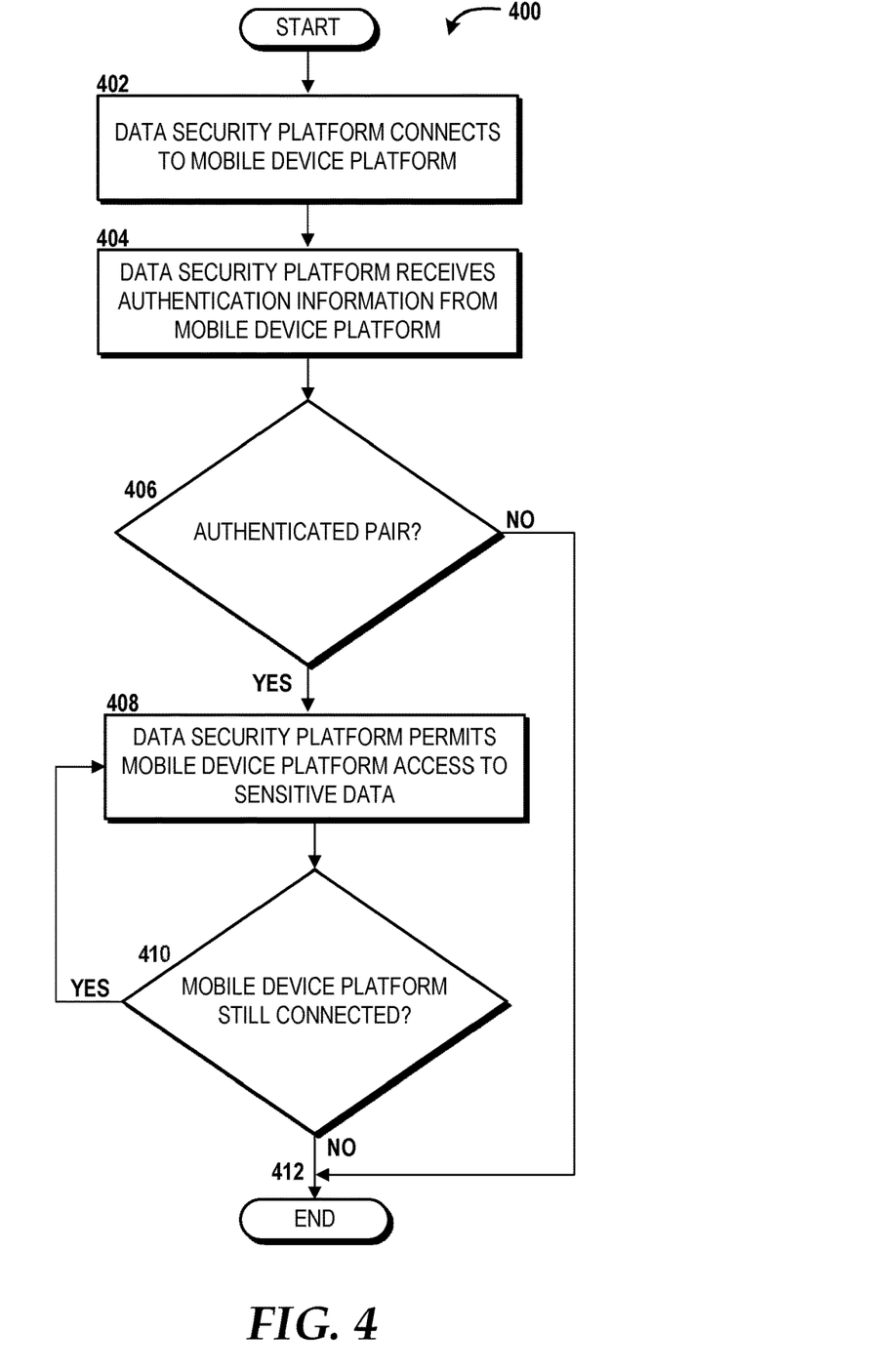
FIG. 4 is a flow diagram illustrating aspects of a method for providing authenticated access to sensitive data from the perspective of a data security platform, according to an illustrative embodiment.

Turning now to FIG. 4, a method 400 for providing authenticated access to the sensitive data 160 from the perspective of the data security platform 104 will be described, according to an illustrative embodiment. The method 400 will be described with reference to FIG. 4 and further reference to FIGS. 1 and 2. The method 400 begins at operation 402, where the data security platform 104 connects to the mobile device platform 102 via the wired connection 204 or the wireless connection 206 (shown in FIGS. 2A and 2B, respectively). From operation 402, the method 400 proceeds to operation 404, where the data security platform 104 receives authentication information from the mobile device platform 102. From operation 404, the method 400 proceeds to operation 406, where the data security platform 104 determines whether the mobile device platform 102 and the data security platform 104 form an authenticated pair.

If, at operation 406, the data security platform 104 determines that the mobile device platform 102 and the data security platform 104 form an authenticated pair, then the method 400 proceeds to operation 408, where the data security platform 104 permits the mobile device platform 102 to access at least a portion of the sensitive data 160. From operation 408, the method 400 proceeds to operation 410, where the data security platform 104 determines if the mobile device platform 102 is still connected. If, at operation 410, the data security platform 104 determines that the mobile device platform 102 is still connected, then the method 400 reverts back to operation 408, where the data security platform 104 can continue to permit the mobile device platform 102 to access at least a portion of the sensitive data 160.

If, however, at operation 410, the data security platform 104 determines that the mobile device platform 102 is no longer connected, then the method 400 proceeds to operation 412. The method 400 ends at operation 412.

Returning to operation 406, if the mobile device platform 102 determines that the data security platform 104 is not authenticated to access the mobile device platform 102, then the method 400 proceeds to operation 412. The method 400 ends at operation 412.

Figure 5:
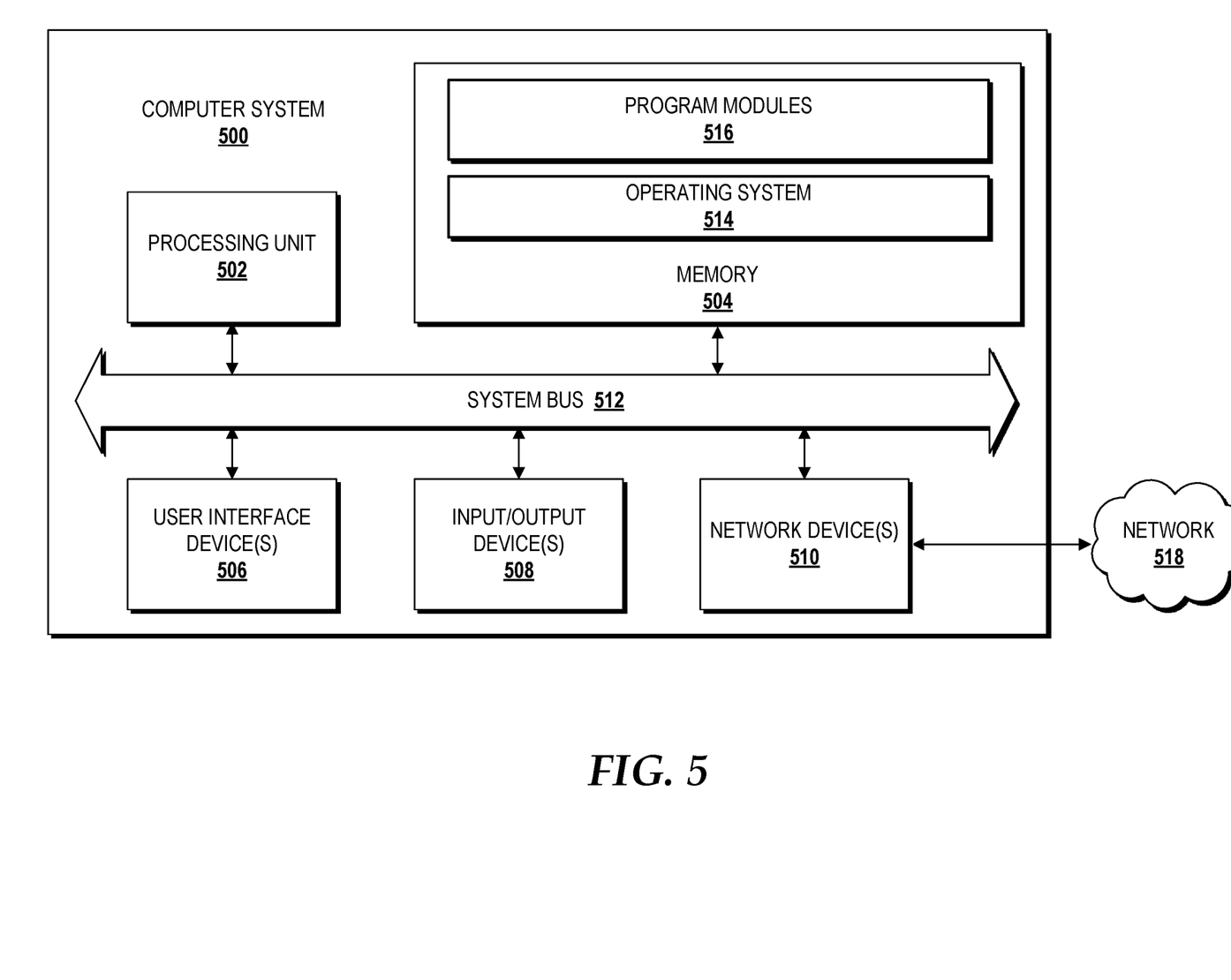
FIG. 5 is a block diagram illustrating an example computer system capable of implementing aspects of the embodiments presented herein.

FIG. 5 is a block diagram illustrating a computer system 500 configured to provide the functionality in accordance with various embodiments of the concepts and technologies disclosed herein. In some implementations, the mobile device platform 102 and/or the data security platform 104 can connect to a computer that utilizes an architecture that is the same as or similar to the architecture of the computer system 500. It should be understood, however, that modification to the architecture may be made to facilitate certain interactions among elements described herein.

The computer system 500 includes a processing unit 502, a memory 504, one or more user interface devices 506, one or more input/output ("I/O") devices 508, and one or more network devices 510, each of which is operatively connected to a system bus 512. The bus 512 enables bi-directional communication between the processing unit 502, the memory 504, the user interface devices 506, the I/O devices 508, and the network devices 510.

The processing unit 502 may be a standard central processor that performs arithmetic and logical operations, a more specific purpose programmable logic controller ("PLC"), a programmable gate array, a system-on-a-chip, or other type of processor known to those skilled in the art and suitable for controlling the operation of the server computer. Processing units are generally known, and therefore are not described in further detail herein.

The memory 504 communicates with the processing unit 502 via the system bus 512. In some embodiments, the memory 504 is operatively connected to a memory controller (not shown) that enables communication with the processing unit 502 via the system bus 512. The memory 504 includes an operating system 514 and one or more program modules 516. The operating system 514 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 516 may include various software and/or program modules to perform the various operations described herein. The program modules 516 and/or other programs can be embodied in computer-readable media containing instructions that, when executed by the processing unit 502, perform one or operations, such as to back up at least a portion of the sensitive data 160. According to embodiments, the program modules 516 may be embodied in hardware, software, firmware, or any combination thereof.

By way of example, and not limitation, computer-readable media may include any available computer storage media or communication media that can be accessed by the computer system 500. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 500. In the claims, the phrase "computer storage medium" and variations thereof does not include waves or signals per se and/or communication media.

The user interface devices 506 may include one or more devices with which a user accesses the computer system 500. The user interface devices 506 may include, but are not limited to, computers, servers, personal digital assistants, cellular phones, or any suitable computing devices. The I/O devices 508 enable a user to interface with the program modules 516. In one embodiment, the I/O devices 508 are operatively connected to an I/O controller (not shown) that enables communication with the processing unit 502 via the system bus 512. The I/O devices 508 may include one or more input devices, such as, but not limited to, a keyboard, a mouse, or an electronic stylus. Further, the I/O devices 508 may include one or more output devices, such as, but not limited to, a display screen or a printer.

The network devices 510 enable the computer system 500 to communicate with other networks or remote systems via a network 518, such as the network 208. Examples of the network devices 510 include, but are not limited to, a modem, a radio frequency ("RF") or infrared ("IR") transceiver, a telephonic interface, a bridge, a router, or a network card. The network 518 may include a wireless network such as, but not limited to, a wireless local area network ("WLAN"), a wireless wide area network ("WWAN"), a wireless personal area network ("WPAN") such as provided via BLUETOOTH technology, a wireless metropolitan area network ("WMAN") such as a WiMAX network or metropolitan cellular network. Alternatively, the network 518 may be a wired network such as, but not limited to, a wide area network ("WAN"), a wired LAN such as provided via Ethernet, a wired personal area network n ("PAN"), or a wired metropolitan area network ("MAN").

Figure 6:
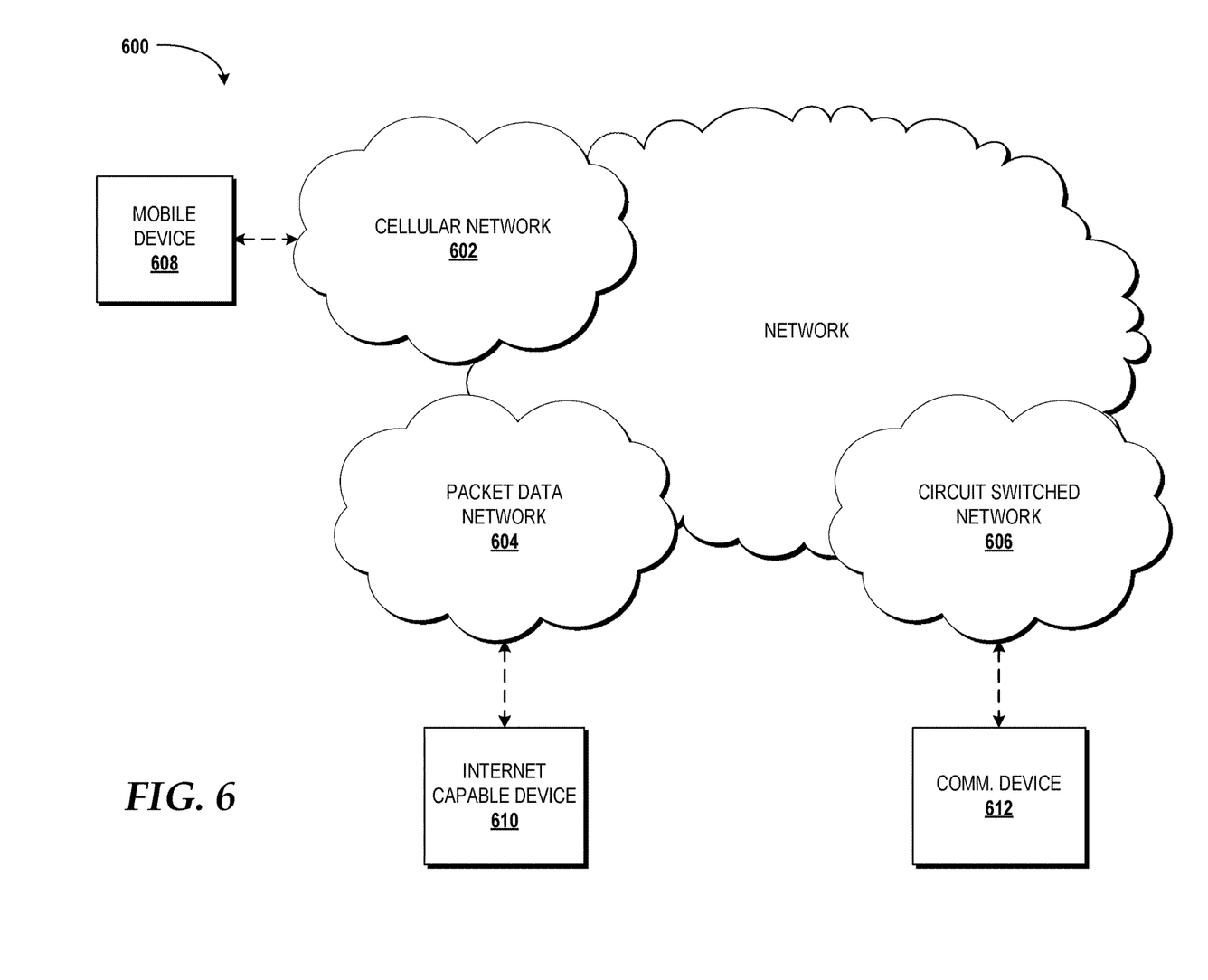
FIG. 6 schematically illustrates a network, according to an illustrative embodiment.

Turning now to FIG. 6, additional details of a network 600, such as the network 208, are illustrated, according to an illustrative embodiment. The network 600 includes a cellular network 602, a packet data network 604, for example, the Internet, and a circuit switched network 606, for example, a publicly switched telephone network ("PSTN"). The cellular network 602 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 602 also includes radios and nodes for receiving and transmitting voice, data, and combinations thereof to and from radio transceivers, networks, the packet data network 604, and the circuit switched network 606.

A mobile communications device 608, such as, for example, the mobile device platform 102, a cellular telephone, a user equipment, a mobile terminal, a PDA, a laptop computer, a handheld computer, and combinations thereof, can be operatively connected to the cellular network 602. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSUPA), and HSPA+. The cellular network 602 also is compatible with 4G mobile communications standards such as LTE, or the like, as well as evolved and future mobile standards.

The packet data network 604 includes various devices, for example, servers, computers, databases, and other devices in communication with one another, as is generally known. The packet data network 604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a plain old telephone system (POTS). The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, for example, the mobile device platform 102, a PC, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 66. In the specification, the network 208 is used to refer broadly to any combination of the networks 602, 604, 606. It should be appreciated that substantially all of the functionality described with reference to the network 208 can be performed by the cellular network 602, the packet data network 604, and/or the circuit switched network 606, alone or in combination with other networks, network elements, and the like.

Based on the foregoing, it should be appreciated that concepts and technologies directed to separating sensitive data from mobile devices for theft prevention have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting.

Various modifications and changes may be made to the subject matter described herein without following the example embodiments and applications illustrated and described, and without departing from the true spirit and scope of the embodiments of the concepts and technologies disclosed herein.

What is claimed is:

1. A mobile device platform comprising:

an interface;

a universal integrated circuit card;

a processor; and a mobile device platform memory component that stores computer-readable instructions that, when executed by the processor, cause the processor to perform operations comprising:

detecting a connection between the mobile device platform and a data security platform via the interface, wherein the data security platform comprises a data security platform memory component that stores sensitive data associated with the mobile device platform, wherein the sensitive data stored on the data security platform memory component of the data security platform comprises at least a portion of subscriber identity module data associated with the mobile device platform, wherein at least the portion of the subscriber identity module data comprises information that allows the mobile device platform to authenticate to and identify the mobile device platform to a network, and wherein the mobile device platform is unable to function without the connection between the mobile device platform and the data security platform, receiving, via the connection between the data security platform and the mobile device platform, authentication information from the data security platform, determining, based at least in part on the authentication information received from the data security platform, whether the data security platform is part of an authenticated pair with the mobile device platform, in response to determining that the data security platform is part of the authenticated pair with the mobile device platform, accessing, from the data security platform via the connection between the data security platform and the mobile device platform, at least the portion of the subscriber identity module data associated with the mobile device platform stored on the data security platform memory component, and providing at least the portion of the subscriber identity module data associated with the mobile device platform from the data security platform to the universal integrated circuit card of the mobile device platform to allow the mobile device platform to authenticate to and identify the mobile device platform to the network in order to access a service accessible via the network, determining whether the data security platform is still connected to the mobile device platform via the interface, and in response to determining that the data security platform is not still connected to the mobile device platform via the interface, performing a denial action to deny access to the data security platform.

2. The mobile device platform of claim 1, wherein the operations further comprise performing a mobile device platform operation with at least the portion of the sensitive data.

3. The mobile device platform of claim 2, wherein the operations further comprise:

determining whether the data security platform is still connected to the mobile device platform via the interface; and in response to determining that the data security platform is still connected to the mobile device platform via the interface, performing a further mobile device platform operation with at least the portion of the sensitive data.

4. The mobile device platform of claim 1, wherein the interface comprises one of a wired interface or a wireless interface.

5. The mobile device platform of claim 1, wherein the data security platform is embodied in a fob form factor for inserting into the interface of the mobile device platform.

6. A mobile device platform memory component that stores instructions that, when executed by a processor of a mobile device platform comprising an interface and a universal integrated circuit card, cause the processor to perform operations comprising:

detecting a connection between the mobile device platform and a data security platform via the interface, wherein the data security platform comprises a data security platform memory component that stores sensitive data associated with the mobile device platform, wherein the sensitive data stored on the data security platform memory component of the data security platform comprises at least a portion of subscriber identity module data associated with the mobile device platform, wherein at least the portion of the subscriber identity module data comprises information that allows the mobile device platform to authenticate to and identify the mobile device platform to a network, and wherein the mobile device platform is unable to function without the connection between the mobile device platform and the data security platform;

receiving, via the connection between the data security platform and the mobile device platform, authentication information from the data security platform;

determining, based at least in part on the authentication information received from the data security platform, whether the data security platform is part of an authenticated pair with the mobile device platform;

in response to determining that the data security platform is part of the authenticated pair with the mobile device platform, accessing, from the data security platform via the connection between the data security platform and the mobile device platform, at least the portion of the subscriber identity module data associated with the mobile device platform stored on the data security platform memory component, and providing at least the portion of the subscriber identity module data associated with the mobile device platform from the data security platform to the universal integrated circuit card of the mobile device platform to allow the mobile device platform to authenticate to and identify the mobile device platform to the network in order to access a service accessible via the network;

determining whether the data security platform is still connected to the mobile device platform via the interface; and in response to determining that the data security platform is not still connected to the mobile device platform via the interface, performing a denial action to deny access to the data security platform.

7. The mobile device platform memory component of claim 6, wherein the operations further comprise performing a mobile device platform operation with at least the portion of the sensitive data.

8. The mobile device platform memory component of claim 7, wherein the operations further comprise:
   determining whether the data security platform is still connected to the mobile device platform via the interface; and
   in response to determining that the data security platform is still connected to the mobile device platform via the interface, performing a further mobile device platform operation with at least the portion of the sensitive data.

9. The mobile device platform memory component of claim 6, wherein the interface comprises one of a wired interface or a wireless interface.

10. The mobile device platform memory component of claim 6, wherein the data security platform is embodied in a fob form factor for inserting into the interface of the mobile device platform.

11. A method comprising:
   detecting, by a processor of a mobile device platform comprising an interface and a universal integrated circuit card, a connection between the mobile device platform and a data security platform via the interface, wherein the data security platform comprises a data security platform memory component that stores sensitive data associated with the mobile device platform, wherein the sensitive data stored on the data security platform memory component of the data security platform comprises at least a portion of subscriber identity module data associated with the mobile device platform, wherein at least the portion of the subscriber identity module data comprises information that allows the mobile device platform to authenticate to and identify the mobile device platform to a network, and wherein the mobile device platform is unable to function without the connection between the mobile device platform and the data security platform;
   receiving, by the processor, via the connection between the data security platform and the mobile device platform, authentication information from the data security platform;
   determining, by the processor, based at least in part on the authentication information received from the data security platform, whether the data security platform is part of an authenticated pair with the mobile device platform;
   in response to determining that the data security platform is part of the authenticated pair with the mobile device platform,
   accessing, by the processor, from the data security platform via the connection between the data security platform and the mobile device platform, at least the portion of the subscriber identity module data associated with the mobile device platform stored on the data security platform memory component, and
   providing at least the portion of the subscriber identity module data associated with the mobile device platform from the data security platform to the universal integrated circuit card of the mobile device platform to allow the mobile device platform to authenticate to and identify the mobile device platform to the network in order to access a service accessible via the network;
   determining whether the data security platform is still connected to the mobile device platform via the interface; and
   in response to determining that the data security platform is not still connected via the interface, performing a denial action to deny access to the data security platform.

12. The method of claim 11, further comprising:
   performing a mobile device platform operation with at least the portion of the sensitive data;
   determining whether the data security platform is still connected to the mobile device platform via the interface; and
   in response to determining that the data security platform is still connected to the mobile device platform via the interface, performing a further mobile device platform operation with at least the portion of the sensitive data.

13. The method of claim 11, wherein the interface comprises one of a wired interface or a wireless interface.

14. The method of claim 11, wherein the data security platform is embodied in a fob form factor for inserting into the interface of the mobile device platform.

* * * * *